US012623547B2

(12) United States Patent
Wang et al.

(10) Patent No.: US 12,623,547 B2
(45) Date of Patent: May 12, 2026

(54) CONTROL SYSTEM, METHOD AND DEVICE FOR VEHICLE REDUNDANT POWER SUPPLY

(71) Applicant: Beijing OCGen Technology Co., Ltd., Beijing (CN)

(72) Inventors: Chi Wang, Beijing (CN); Xiaokang He, Beijing (CN); Pingyuan Ji, Beijing (CN)

(73) Assignee: Beijing OCGen Technology Co., Ltd., Beijing (CN)

( * ) Notice: Subject to any disclaimer, the term of this patent is extended or adjusted under 35 U.S.C. 154(b) by 273 days.

(21) Appl. No.: 18/345,156

(22) Filed: Jun. 30, 2023

(65) Prior Publication Data

US 2024/0001765 A1 Jan. 4, 2024

(30) Foreign Application Priority Data

Jul. 4, 2022 (CN) .......................... 202210785710.4

(51) Int. Cl.
B60L 3/00 (2019.01)
H02J 1/10 (2006.01)
H02J 1/102 (2026.01)

(52) U.S. Cl.
CPC ........... B60L 3/0046 (2013.01); B60L 3/0092 (2013.01); H02J 1/102 (2013.01);
(Continued)

(58) Field of Classification Search
CPC ........... B60W 50/0205; B60W 50/029; B60W 50/023
See application file for complete search history.

(56) References Cited

U.S. PATENT DOCUMENTS 8,395,917 B2 * 3/2013 Humphrey .......... H02M 3/1584
363/67
2013/0227310 A1 * 8/2013 Jau ............................ G06F 1/26
713/300
(Continued)

FOREIGN PATENT DOCUMENTS

CN 110034555 7/2019
CN 110365090 10/2019
(Continued)

OTHER PUBLICATIONS

Extended European Search Report in European Appln. No. 23183003.5, dated Feb. 5, 2024, 9 pages.

*Primary Examiner* — Huy Q Phan
*Assistant Examiner* — Temilade S Rhodes-Vivour
(74) *Attorney, Agent, or Firm* — Fish & Richardson P.C.

(57) ABSTRACT

The present disclosure provides a control system, method and device for vehicle redundant power supply. The system comprises: a main power supply circuit comprising a main power supply monitoring module for monitoring the main power supply circuit and generating monitoring information indicating whether a power supply fault exists in the main power supply circuit; and a redundant power supply circuit comprising a redundant power supply monitoring module for monitoring the main power supply circuit and generating monitoring information indicating whether a power supply fault exists in the redundant power supply circuit; and a vehicle control unit connected to the main power supply circuit and the redundant power supply circuit respectively, and configured for determining one of the main power supply circuit and the redundant power supply circuit as a target power supply circuit for vehicle running according to monitoring information.

20 Claims, 4 Drawing Sheets

(52) U.S. Cl.
CPC ... *B60L 2240/427* (2013.01); *B60L 2240/429*
(2013.01); *H02J 2310/48* (2020.01)

(56) References Cited

U.S. PATENT DOCUMENTS

| | | | | |
|---|---|---|---|---|
| 2016/0359741 A1* | 12/2016 | Cooper | .................... | H04W 4/44 |
| 2018/0029474 A1* | 2/2018 | Berels | ..................... | B60L 58/15 |
| 2019/0391577 A1* | 12/2019 | Uppalapati | ............... | B60L 3/12 |
| 2020/0313457 A1 | 10/2020 | Kozuki | | |
| 2021/0086655 A1* | 3/2021 | Li | ......................... | B60L 3/0015 |
| 2021/0276425 A1 | 9/2021 | Gauthier et al. | | |
| 2022/0017108 A1* | 1/2022 | Komatsu | ............. | G07C 5/0816 |
| 2022/0063414 A1 | 3/2022 | Kim et al. | | |

FOREIGN PATENT DOCUMENTS

| | | |
|---|---|---|
| CN | 210985730 | 7/2020 |
| CN | 112260394 | 1/2021 |

* cited by examiner

420

440

Main power supply circuit

Main power supply monitoring module

421

Switch element | Switch element | ... | Switch element

Sub vehicle control unit

Storage battery

Load 1 | Load 2 | ... | Load m

410

Vehicle control unit    460

430

Electric generator

Load 1 | Load 2 | ... | Load m

Sub vehicle control unit

Switch element | Switch element | ... | Switch element

Storage battery

450

431

Redundant power supply monitoring module

Redundant power supply circuit

FIG. 4

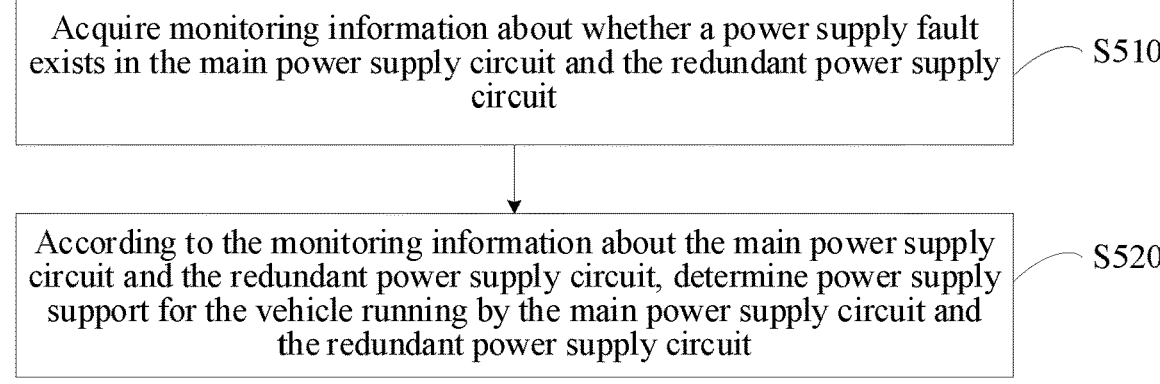

Acquire monitoring information about whether a power supply fault exists in the main power supply circuit and the redundant power supply circuit — S510

According to the monitoring information about the main power supply circuit and the redundant power supply circuit, determine power supply support for the vehicle running by the main power supply circuit and the redundant power supply circuit — S520

FIG. 5

CONTROL SYSTEM, METHOD AND DEVICE FOR VEHICLE REDUNDANT POWER SUPPLY

CROSS-REFERENCE TO RELATED APPLICATION

The present disclosure claims priority to Chinese patent application No. 202210785710.4, titled "CONTROL SYSTEM, METHOD AND DEVICE FOR VEHICLE REDUNDANT POWER SUPPLY", filed on Jul. 4, 2022, the content of which is incorporated herein by reference in its entirety.

TECHNICAL FIELD

The embodiments of the present disclosure relate to the technical field of vehicle control, in particular to a control system, a method and a device for vehicle redundant power supply.

BACKGROUND

In the field of vehicle unmanned driving, in order to ensure the safety of the vehicle during automatic driving, it is usually necessary to provide a redundant power supply structure for a vehicle, which supports two storage batteries to switch for power supply.

The existing redundant power supply systems usually need to switch between multiple power supply systems to achieve the overall performance indicators of the vehicle power supply. However, specially developed dedicated hardware equipment is usually adopted in each power supply system to adapt to the requirements of vehicle redundant power supply so as to ensure the safety of the vehicle redundant power supply as much as possible, thereby causing problems of high cost and increased difficulty in the configuration of a redundant power supply system.

SUMMARY

Embodiments of the present disclosure provide a control system, a method and a device for vehicle redundant power supply. The redundant power supply of the vehicle is implemented by using conventional hardware modules such that the cost and configuration difficulty of the redundant power supply of the vehicle are reduced, and the safety and reliability of the redundant power supply of the vehicle are improved.

According to one aspect of the present disclosure, a control system for vehicle redundant power supply is provided. The system comprises:

a main power supply circuit comprising a main power supply monitoring module for monitoring the main power supply circuit and generating monitoring information indicating whether a power supply fault exists in the main power supply circuit;

a redundant power supply circuit comprising a redundant power supply monitoring module for monitoring the redundant power supply circuit and generating monitoring information indicating whether a power supply fault exists in the redundant power supply circuit; and a vehicle control unit connected to the main power supply circuit and the redundant power supply circuit respectively, and configured for determining one of the main power supply circuit and the redundant power supply circuit as a target power supply circuit for controlling the vehicle running according to monitoring information about the main power supply circuit and the redundant power supply circuit.

According to another aspect of the present disclosure, there is provided a control method for vehicle redundant power supply which is applicable to a control system for vehicle redundant power supply provided in one or more embodiments of the present disclosure. The method comprises:

acquiring monitoring information about whether a power supply fault exists in a main power supply circuit and a redundant power supply circuit; and according to the monitoring information about the main power supply circuit and the redundant power supply circuit, determining one of the main power supply circuit and the redundant power supply circuit as a target power supply circuit for controlling the vehicle running.

According to another aspect of the present disclosure, there is provided a control device based on the vehicle redundant power supply which can be configured in a control system for the vehicle redundant power supply provided in one or more embodiments of the present disclosure. The device comprises:

a monitoring information acquisition module for acquiring monitoring information about whether a power supply fault exists in a main power supply circuit and a redundant power supply circuit; and a vehicle control module for, according to the monitoring information about the main power supply circuit and the redundant power supply circuit, determining one of the main power supply circuit and the redundant power supply circuit as a target power supply circuit for controlling the vehicle running according to monitoring information about the main power supply circuit and the redundant power supply circuit.

According to another aspect of the present disclosure, computing device is provided. The computing device comprises:

a processor and a memory, wherein the memory is configured to store a computer program, and the processor is configured to call and run a computer program stored in the memory to execute the control method based on vehicle redundant power supply provided by one or more embodiments of the present disclosure.

According to another aspect of the present disclosure, there is provided a computer-readable storage medium for storing a computer program for causing a computer to execute the control method based on vehicle redundant power supply provided by one or more embodiments of the present disclosure.

According to the technical scheme provided in the embodiments of the present disclosure, the electric generator is connected to the main power supply circuit and the redundant power supply circuit respectively, and corresponding power supply monitoring modules are connected in series in each power supply circuit of the main power supply circuit and the redundant power supply circuit; the power supply monitoring modules in the main power supply circuit and the redundant power supply circuit are respectively connected to the vehicle control unit, thereby using conventional hardware module to achieve redundant power supply for the vehicle and reducing the cost and configuration difficulty of redundant power supply for the vehicle. Furthermore, the main power supply monitoring module in the main power supply circuit and the redundant power supply monitoring module in the redundant power supply circuit respectively monitor whether there is a power supply fault in the power supply circuit where they are located, and send the monitoring information to the vehicle control unit; the vehicle control unit determines the power supply support of the main power supply circuit and the redundant power supply circuit for vehicle running according to the monitoring information about the main power supply circuit and the redundant power supply circuit; a conventional hardware module is used to realize the fault monitoring of any circuit of the vehicle redundant power supply so as to isolate the main power supply circuit and the redundant power supply circuit, so that the two power supply circuits do not affect each other, thereby improving the safety and reliability of vehicle redundant power supply.

BRIEF DESCRIPTION OF THE DRAWINGS

In order to illustrate the technical schemes in the embodiments of the present disclosure more clearly, the following will briefly introduce the drawings that need to be used in the description of the embodiments. Obviously, the drawings described below are merely some embodiments of the present disclosure. For those of ordinary skills in the art, other drawings can be obtained according to these drawings without involving inventive efforts.

FIG. 4 is a schematic diagram of the principle of another control system for vehicle redundant power supply shown in an embodiment of the present disclosure;

FIG. 5 is a flowchart of a control method based on vehicle redundant power supply shown in an embodiment of the present disclosure;

DETAILED DESCRIPTION

The technical schemes in the embodiments of the present disclosure will be clearly and completely described below in conjunction with the accompanying drawings in the embodiments of the present disclosure. Obviously, the described embodiments are only a part of the embodiments of the present disclosure, rather than all the embodiments. Based on the embodiments of the present disclosure, all other embodiments obtained by one of ordinary skills in the art without involving any inventive effort are within the scope of the present disclosure.

It needs to be noted that the terms "first", "second", and the like in the description of the present disclosure, in the claims, and in the accompanying drawings are configured for distinguishing between similar objects and not necessarily for describing a particular sequential or chronological order. It should be understood that the data used in this way can be interchanged in appropriate cases, so that the embodiments described herein can be implemented in order other than those shown or described herein. Furthermore, the terms "comprise" and "has", as well as any variations thereof, are intended to cover a non-exclusive inclusion, for example, the scenario that a process, method, system, product, or server that comprises a list of steps or units is not necessarily limited to those steps or units expressly listed, and other steps or units not expressly listed or inherent to such process, method, product, or equipment may be included.

In order to ensure the safety of vehicle automatic driving, an embodiment of the present disclosure designs a new vehicle redundant power supply system to ensure the safety and reliability of the vehicle redundant power supply on the basis of ensuring the low cost and low configuration difficulty of vehicle redundant power supply.

Figure 1:
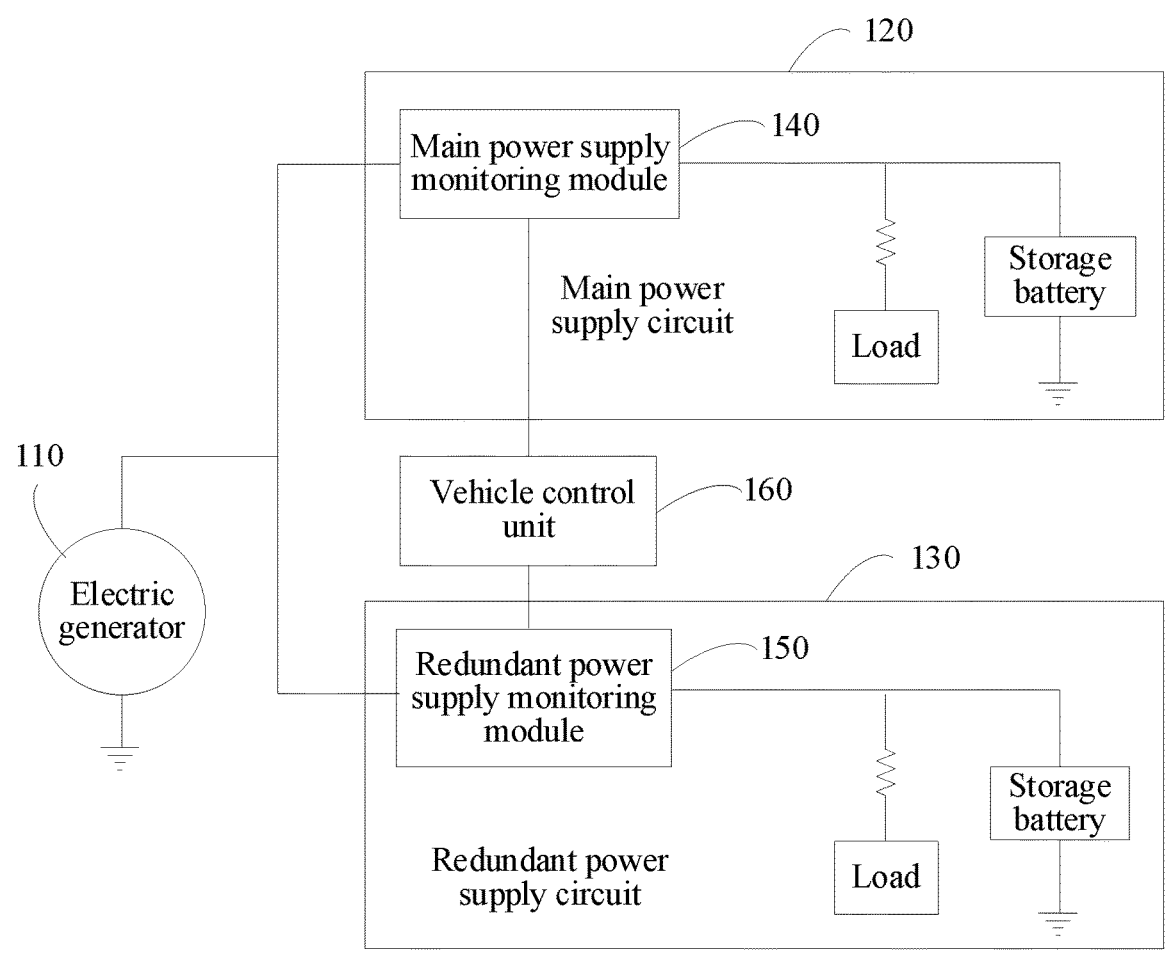
FIG. 1 is a schematic diagram of the principle of a control system for vehicle redundant power supply shown in an embodiment of the present disclosure.

FIG. 1 is a schematic diagram of the principle of a control system for vehicle redundant power supply shown in an embodiment of the present disclosure. As shown in FIG. 1, a control system for a vehicle redundant power supply may comprise a primary power supply circuit 120 and a redundant power supply circuit 130 electrically connected to an electric generator 110, respectively.

The main power supply circuit 120 comprises therein a main power supply monitoring module 140, the redundant power supply circuit 130 comprises therein a redundant power supply monitoring module 150, and the main power supply monitoring module 140 and the redundant power supply monitoring module 150 are respectively connected to a vehicle control unit 160.

Specifically, the main power supply monitoring module 140 is configured for monitoring the main power supply circuit and generating monitoring information indicating whether a power supply fault is present in the main power supply circuit 120, and sending monitoring information to the vehicle control unit 160; the redundant power supply monitoring module 150 is configured for monitoring the redundant power supply circuit and generating monitoring information indicating whether a power supply fault is present in the redundant power supply circuit 130, and sending monitoring information to the vehicle control unit 160; the vehicle control unit 160 is configured for determining the power supply support of the main power supply circuit 120 and the redundant power supply circuit 130 for controlling the vehicle running according to the monitoring information of the main power supply circuit 120 and the redundant power supply circuit 130, i.e., determining which power supply circuit supports the vehicle running or operation. In other word, the vehicle control unit 160 is configured for determining one of the main power supply circuit 120 and the redundant power supply circuit 130 as a target power supply circuit for controlling the vehicle running according to the monitoring information.

According to one or more embodiments of the present disclosure, an electric generator 110 is typically installed in a vehicle as a source of power supply for the vehicle. Then, after the electric generator 110 is started, other forms of energy in the vehicle are converted into electric energy, and the corresponding electric energy is output to the vehicle.

Therefore, in order to achieve a redundant power supply for the vehicle, the present disclosure will connect two power supply circuits, one as the main power supply circuit 120 and the other as the redundant power supply circuit 130, respectively, through the electric generator 110.

Furthermore, in order to ensure the safe switching of the power supply between the main power supply circuit and the redundant power supply circuit during the automatic driving of the vehicle, the present disclosure will respectively connect corresponding power supply monitoring modules in series in each of the main power supply circuit 120 and the redundant power supply circuit 130, namely, the main power supply monitoring module 140 and the redundant power supply monitoring module 150 in the present application.

Then, any power supply monitoring module of the main power supply monitoring module 140 and the redundant power supply monitoring module 150 can judge whether there is a power supply fault in the power supply circuit where it is located by monitoring the power supply amount change in the power supply circuit where it is located in real time, and generate monitoring information about whether there is a power supply fault in the power supply circuit where it is located.

In order to control the timely switching between the main power supply circuit 120 and the redundant power supply circuit 130, both the main power supply monitoring module 140 and the redundant power supply monitoring module 150 send monitoring information about whether there is a power supply fault in the power supply circuit where they are located to the vehicle control unit 160. Then, the vehicle control unit 160 analyzes the monitoring information of the main power supply circuit 120 and the redundant power supply circuit 130, respectively, and determines whether any of the main power supply circuit 120 and the redundant power supply circuit 130 has a power supply fault.

Considering that the power supply circuit with a power supply fault cannot support the safe running of the vehicle, the vehicle control unit 160 switches the power supply support of the main power supply circuit 120 and the redundant power supply circuit 130 timely for the running/operation of the vehicle according to whether the power supply fault exists in the main power supply circuit 120 and the redundant power supply circuit 130, and the normal running of the vehicle is controlled by the load normally powered in a certain power supply circuit that does not have a power supply fault. That is, the vehicle control unit 160 may select one of the main power supply circuit 120 and the redundant power supply circuit 130 in which there is no power supply fault, and control the vehicle running by using the load normally powered in the power supply circuit.

As an alternative implementation scheme in the present disclosure, considering the redundant power supply circuit 130 as a backup power supply scheme for the main power supply circuit 120, the power supply capability of the redundant power supply circuit 130 may not be as comprehensive as the power supply capability of the main power supply circuit 120. Therefore, when there is no power supply fault in the main power supply circuit 120, regardless of whether there is a power supply fault in the redundant power supply circuit 130, the vehicle running can be controlled by the load normally powered in the main power supply circuit 120. However, when there is a power supply fault in the main power supply circuit 120, the redundant power supply circuit 130 is controlled to take over the control authority of the vehicle running, and the vehicle running is controlled by the load normally powered in the redundant power supply circuit 130.

In the present disclosure, the main power supply circuit 120 and the redundant power supply circuit 130 mainly supply electric energy to various types of working devices when the vehicle is running. Next, taking any one of the main power supply circuit 120 and the redundant power supply circuit 130 as an example, the basic structure of the power supply circuit will be explained as follows:

any power supply circuit may comprise a storage battery and various types of loads supporting normal vehicle running. Among other things, the storage battery in any power supply circuit may provide corresponding electric energy to the power supply circuit in the event of a fault of the electric generator 110. Furthermore, by supplying electric power to each type of loads in any power supply circuit, the normal operation of each type of loads is controlled to ensure the safe running of the vehicle.

It should be understood that the load within the main power supply circuit 120 may comprise both a first type of load relating to performance item and a second type of load relating to safety item. Among other things, the first type of load may be those that are not readily redundant or have an impact on vehicle running performance, such as an engine and a sensor, a starter, a lighting system, an air conditioning system, etc. thereof. The second type of load may be an important load related to vehicle running safety, such as a load in a braking system, a steering system, an automatic driving system, etc. The second type of load can ensure that the vehicle can at least achieve basic safety functions such as braking, steering, and avoiding obstacles under a power supply fault, rather than losing control.

Moreover, the load within the redundant power supply circuit 130 may comprise a redundant second type of load relating to safety item, which is a redundancy of the second type of load such as a load in a braking system, a steering system, an automatic driving system, etc. In the event of a power supply fault of the first type of load and the second type of load in the main power supply circuit 120, the redundant second type of load in the redundant power supply circuit 130 may at least ensure safe parking or continued running of the vehicle under a power supply fault, rather than losing control.

As an alternative implementation scheme in the present disclosure, with regard to the main power supply monitoring module 140 and the redundant power supply monitoring module 150, the present disclosure may connect any one of the main power supply monitoring module 140 and the redundant power supply monitoring module 150 in series between the electric generator 110 and the positive electrode circuit of the storage battery in the power supply circuit where the electric generator 110 is located, and install the same in the vicinity of the storage battery in the power supply circuit where the electric generator 110 is located, so as to accurately monitor whether there is a power supply fault in the power supply circuit.

Furthermore, the main power supply monitoring module 140 in the main power supply circuit 120 and the redundant power supply monitoring module 150 in the redundant power supply circuit 130 can be respectively connected to the vehicle control unit 160 via a control unit area network (CAN) bus.

Figure 2:
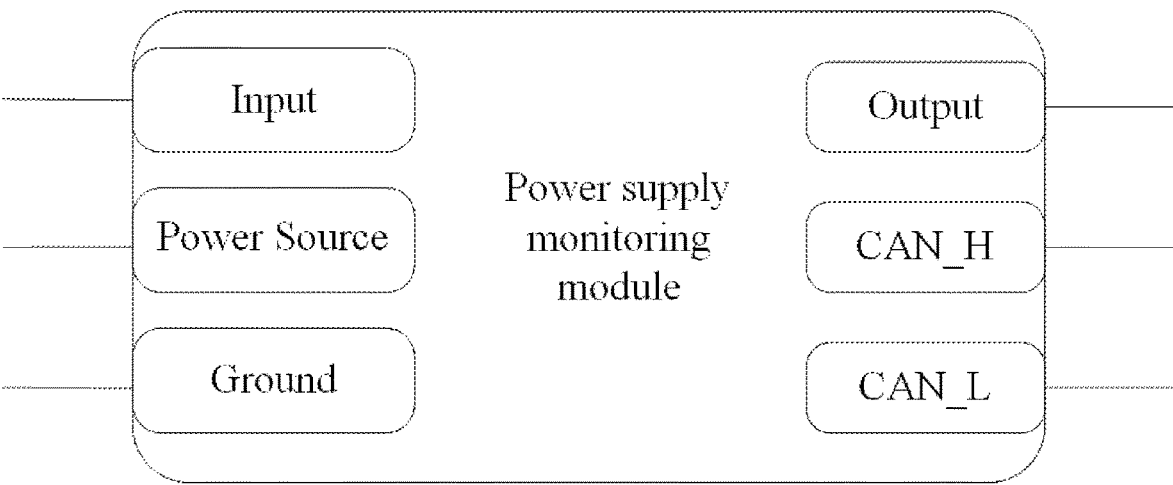
FIG. 2 is a schematic diagram of a circuit interface of a monitoring module in either a main power supply circuit or a redundant power supply circuit shown in an embodiment of the present disclosure.

As shown in FIG. 2, any one of the main power supply monitoring module 140 and the redundant power supply monitoring module 150 may comprise six kinds of circuit interfaces of input, output, CAN_H (high data line), CAN_L (low data line), power source, and ground. An input interface of any one of the power supply monitoring modules is connected to the electric generator 110, an output interface of any one of the power supply monitoring modules is connected to a load in a power supply circuit where the power supply monitoring module is located, a CAN_H interface of any one of the power supply monitoring modules is connected to a CAN_H interface of the vehicle control unit 160, a CAN_L interface of any one of the power supply monitoring modules is connected to a CAN_L interface of the vehicle control unit 160, a power source interface of any one of the power supply monitoring modules is connected to the positive electrode of a storage battery in the power supply circuit where the power supply monitoring module is located, and a ground interface of any one of the power supply monitoring modules is connected to a negative electrode of a storage battery in the power supply circuit where the power supply monitoring module is located.

According to the technical scheme provided in this disclosure, the electric generator is connected to the main power supply circuit and the redundant power supply circuit respectively, and corresponding power supply monitoring modules are connected in series in each power supply circuit of the main power supply circuit and the redundant power supply circuit; the power supply monitoring modules in the main power supply circuit and the redundant power supply circuit are respectively connected to the vehicle control unit, thereby using conventional hardware module to achieve redundant power supply for the vehicle and reducing the cost and configuration difficulty of redundant power supply for the vehicle. Furthermore, the main power supply monitoring module in the main power supply circuit and the redundant power supply monitoring module in the redundant power supply circuit respectively monitor whether there is a power supply fault in the power supply circuit where they are located, and send the monitoring information to the vehicle control unit; the vehicle control unit determines the power supply support of the main power supply circuit and the redundant power supply circuit for controlling vehicle running according to the monitoring information about the main power supply circuit and the redundant power supply circuit; a conventional hardware module is used to realize the fault monitoring of any circuit of the vehicle redundant power supply so as to isolate the main power supply circuit and the redundant power supply circuit, so that the two power supply circuits do not affect each other, thereby improving the safety and reliability of vehicle redundant power supply.

According to one or more embodiments of the present disclosure, further description will be made of a process in which the main power supply monitoring module and the redundant power supply monitoring module monitor whether there is a power supply fault in the power supply circuit in which they are located, and the vehicle control unit determines power supply support for vehicle running by the main power supply circuit and the redundant power supply circuit. The structures of the power supply monitoring modules in the main power supply circuit and the redundant power supply circuit and the vehicle control unit will be described in detail with reference to FIG. 3.

Figure 3:
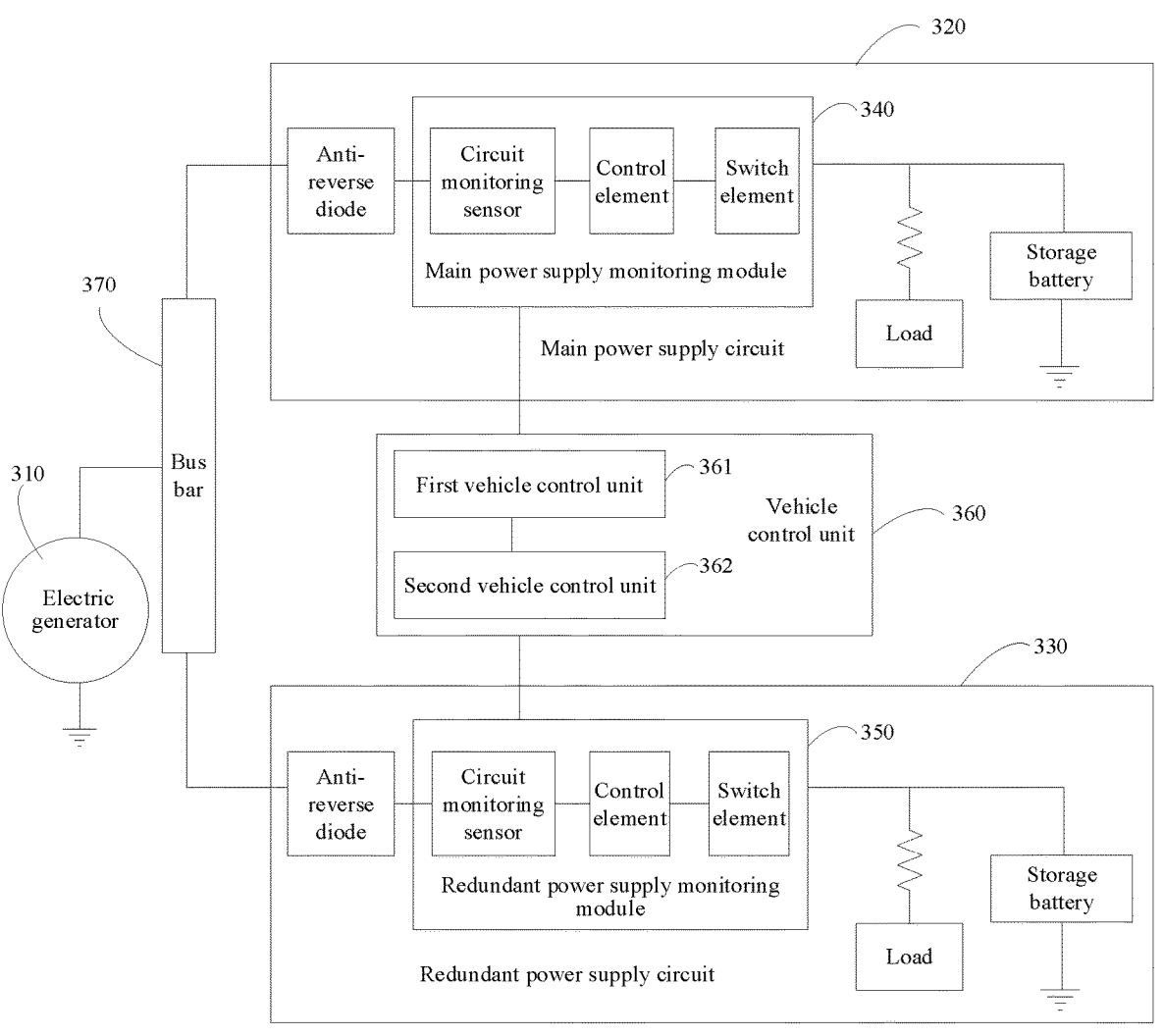
FIG. 3 is a schematic diagram of the principle of another control system for vehicle redundant power supply shown in an embodiment of the present disclosure.

FIG. 3 is a schematic diagram of the principle of another control system for vehicle redundant power supply shown in an embodiment of the present disclosure. As shown in FIG. 3, a control system for a vehicle redundant power supply may comprise a primary power supply circuit 320 and a redundant power supply circuit 330 connected to an electric generator 310, respectively.

The main power supply circuit 320 comprises therein a main power supply monitoring module 340, the redundant power supply circuit 330 comprises therein a redundant power supply monitoring module 350, and the main power supply monitoring module 340 and the redundant power supply monitoring module 350 are respectively connected to a vehicle control unit 360.

Specifically, the main power supply monitoring module 340 is configured for monitoring whether a power supply fault is present in the main power supply circuit 320, and sending monitoring information to the vehicle control unit 360; the redundant power supply monitoring module 350 is configured for monitoring whether a power supply fault is present in the redundant power supply circuit 330, and sending monitoring information to the vehicle control unit 360; the vehicle control unit 360 is configured for determining the power supply support of the main power supply circuit 320 and the redundant power supply circuit 330 for the vehicle running according to the monitoring information of the main power supply circuit 320 and the redundant power supply circuit 330.

It needs to be noted that the electric generator 310, the main power supply circuit 320, the redundant power supply circuit 330, the main power supply monitoring module 340, the redundant power supply monitoring module 350, and the vehicle control unit 360 in the present disclosure have the same principle and function as the electric generator 110, the main power supply circuit 120, the redundant power supply circuit 130, the main power supply monitoring module 140, the redundant power supply monitoring module 150, and the vehicle control unit 160 mentioned in the above-mentioned embodiments, and will not be described in detail.

In the present disclosure, the control system for vehicle redundant power supply may also comprise a bus bar 370.

Here, the electric generator 310 may be connected to the main power supply circuit 320 and the redundant power supply circuit 330 through the bus bar 370, respectively.

Specifically, the bus bar 370 may divide the current output by electric generator 310 into two for the transmission to the main power supply circuit 320 and the redundant power supply circuit 330, respectively, thereby isolating the main power supply circuit 320 and the redundant power supply circuit 330.

It needs to be noted that the bus bar 370 in the present disclosure may be a copper bar, a silver bar, a tin bar, or the like, which will not be limited herein.

Furthermore, in order to ensure the rectification in the main power supply circuit 320 and the redundant power supply circuit 330, the present disclosure may set one anti-reverse diode in any of the main power supply circuit 320 and the redundant power supply circuit 330, respectively, and control the unidirectional rectification of the current in the power supply circuit via the anti-reverse diode such that the backflow of the current in the main power supply circuit 320 and the redundant power supply circuit 330 is prevented, thereby isolating the main power supply circuit 320 and the redundant power supply circuit 330.

According to one or more embodiments of the present disclosure, any of the main power supply monitoring module 340 and the redundant power supply monitoring module 350 may comprise at least a monitoring sensor, a switch element, and a control element.

Specifically, a monitoring sensor in any one of the main power supply monitoring module 340 and the redundant power supply monitoring module 350 can monitor/detect/acquire/determine a sensing parameter in a power supply circuit where it is located, and send the sensing parameter to the control element; the control element determines whether there is a power supply fault in the power supply circuit according to the sensing parameter, controls the on state and off state of the switch element and generates the corresponding monitoring information.

That is to say, the monitoring sensor in any one of the main power supply monitoring module 340 and the redundant power supply monitoring module 350 can monitor the power supply amount change condition in the power supply circuit where it is located in real time as one of a sensing parameter in the present disclosure. Then, the monitoring sensor sends the sensing parameter in the power supply circuit to the control element in the power supply circuit.

The control element in the power supply circuit analyzes whether the sensing parameter is within the normal power supply range to determine whether there is a power supply fault in the power supply circuit.

When the control element in any of the power supply monitoring modules determines that there is a power supply fault in the power supply circuit, the switch element in the power supply circuit can be controlled to be off so that the power supply circuit is no longer powered. When the control element in any power supply monitoring module determines that there is no power supply fault in the power supply circuit, the switch element in the power supply circuit can be controlled to be still in a closed state so that the power supply circuit maintains normal power supply.

Further, the control element generates monitoring information on whether or not there is a power supply fault in the power supply circuit, and sends the monitoring information to the vehicle control unit 360.

As an exemplary scheme in the present disclosure, the monitoring sensor in any of the main power supply monitoring module 340 and the redundant power supply monitoring module 350 may comprise at least one of the current sensor, voltage sensor, and temperature sensor. The switch element may be a Metal-Oxide-Semiconductor Field-Effect Transistor (MOSFET) switch, abbreviated as a MOS tube switch.

Then, the control element in any of the power supply monitoring modules may determine whether a power supply fault exists in the power supply circuit by determining whether the current, voltage, and temperature sensing parameters of the above-mentioned current sensor, voltage sensor, and temperature sensor exceed a preset upper limit value.

Further, the vehicle control unit 360 of the present disclosure may comprise a first vehicle control unit 361 and a second vehicle control unit 362 communicatively connected for accurate control of the main power supply circuit 320 and the redundant power supply circuit 330.

The first vehicle control unit 361 is connected to the main power supply monitoring module 340 in the main power supply circuit 320, and the second vehicle control unit 362 is connected to the redundant power supply monitoring module 350 in the redundant power supply circuit 330.

Specifically, the first vehicle control unit 361 is configured for sending the monitoring information about the main power supply circuit 320 to the second vehicle control unit 362, and determining the power supply support for the vehicle running by the redundant power supply circuit 330 according to the monitoring information about the redundant power supply circuit 330 sent by the second vehicle control unit 362; the second vehicle control unit 362 is configured to send the monitoring information about the redundant power supply circuit 330 to the first vehicle control unit 361, and determine the power supply support of the main power supply circuit for the vehicle running according to the monitoring information about the main power supply circuit 320 sent by the first vehicle control unit 361.

That is, the first vehicle control unit 361 acquires the monitoring information of whether or not there is a power supply fault in the main power supply circuit 320 from the main power supply monitoring module 340. The second vehicle control unit 362 acquires monitoring information about whether there is a power supply fault in the redundant power supply circuit 330 from the redundant power supply monitoring module 350.

Then, the first vehicle control unit 361 and the second vehicle control unit 362 respectively send the monitoring information about a certain power supply circuit acquired by themselves to the other party, so that both the first vehicle control unit 361 and the second vehicle control unit 362 can learn the monitoring information about whether there is a power supply fault in the main power supply circuit 320 and the redundant power supply circuit 330.

In the present disclosure, since the first vehicle control unit 361 may control the power supply support of the main power supply circuit 320 for the vehicle running, and the second vehicle control unit 362 may control the power supply support of the redundant power supply circuit 330 for the vehicle running, the first vehicle control unit 361 determines the power supply support of the redundant power supply circuit 330 for the vehicle running according to the monitoring information on whether there is a fault in the redundant power supply circuit 330, so as to determine whether the load in the redundant power supply circuit 330 is suitable for controlling vehicle running; the second vehicle control unit 362 determines the power supply support of the main power supply circuit 320 for vehicle running according to the monitoring information about whether there is a fault in the main power supply circuit 320, so as to determine whether the load normally powered in the redundant power supply circuit 330 needs to take over the control authority for vehicle running, thereby improving the reliability of the vehicle redundant power supply.

The technical scheme provided by the present disclosure is to use a monitoring sensor, a switch element, and a control element to constitute a power supply monitoring module in any power supply circuit, and to set a vehicle control unit to be divided into the first vehicle control unit and the second vehicle control unit, so as to respectively control the control authority of the main power supply circuit and the redundant power supply circuit for vehicle running, thereby using a conventional hardware module to realize the redundant power supply of a vehicle, reduce the cost and configuration difficulty of the redundant power supply of the vehicle, and further improve the safety and reliability of the redundant power supply of the vehicle.

According to one or more embodiments of the present disclosure, in the event of a power supply fault in either the main power supply circuit or the redundant power supply circuit, the present application will also explain, in conjunction with FIG. 4, how to locate a particular fault point within that power supply circuit.

FIG. 4 is a schematic diagram of the principle of another control system for vehicle redundant power supply shown in an embodiment of the present disclosure. As shown in FIG. 4, a control system for vehicle redundant power supply may comprise a primary power supply circuit 420 and a redundant power supply circuit 430 connected to an electric generator 410, respectively.

The main power supply circuit 420 comprises therein a main power supply monitoring module 440, the redundant power supply circuit 430 comprises therein a redundant power supply monitoring module 450, and the main power supply monitoring module 440 and the redundant power supply monitoring module 450 are respectively connected to a vehicle control unit 460.

Specifically, the main power supply monitoring module 440 is configured for monitoring whether a power supply fault is present in the main power supply circuit 420, and sending monitoring information to the vehicle control unit 460; the redundant power supply monitoring module 450 is configured for monitoring whether a power supply fault is present in the redundant power supply circuit 430, and sending monitoring information to the vehicle control unit 460; the vehicle control unit 460 is configured for determining the power supply support of the main power supply circuit 420 and the redundant power supply circuit 430 for the vehicle running according to the monitoring information of the main power supply circuit 420 and the redundant power supply circuit 430.

It needs to be noted that the electric generator 410, the main power supply circuit 420, the redundant power supply circuit 430, the main power supply monitoring module 440, the redundant power supply monitoring module 450, and the vehicle control unit 460 in the present disclosure have the same principle and function as the electric generator 110, the main power supply circuit 120, the redundant power supply circuit 130, the main power supply monitoring module 140, the redundant power supply monitoring module 150, and the vehicle control unit 160 mentioned in the above-mentioned embodiments, and will not be described in detail.

In the present disclosure, as shown in FIG. 4, a main distribution box 421 may be comprised in the main power supply circuit 420, and the main distribution box 421 is connected to the vehicle control unit 460 and each load in the main power supply circuit 420, for monitoring a power supply signal of each load in the main power supply circuit 420 and sending the power supply signal of each load to the vehicle control unit 460. The monitoring the power supply signal of each load means monitoring whether each load is powered, and the power supply stata such as normally powered, short circuit state and open circuit state. The power supply signal further comprises at least one of supply current value, supply voltage value, power supply quantity.

A redundant distribution box 431 may be comprised in the redundant power supply circuit 430. The redundant distribution box 431 is connected to the vehicle control unit 460 and each load in the redundant power supply circuit 430, and is configured for monitoring the power supply signal of each load in the redundant power supply circuit and sending the same to the vehicle control unit 460.

In some implementable ways, any distribution box of the main distribution box 421 and the redundant distribution box 431 will establish one internal access with each load in the power supply circuit where it is located, and a corresponding switch element, such as a MOS tube switch, may be set in each internal access so as to timely turn off the switch element in the internal access in the event of a power supply fault in the internal access of a certain load.

Furthermore, a storage battery or an electric generator of any power supply circuit can supply power to a load in the power supply circuit via a distribution box in the power supply circuit. Furthermore, any one of the main distribution box 421 and the redundant distribution box 431 can monitor a power supply signal in internal access between the distribution box and each load in the power supply circuit via a sub-whole-vehicle control unit provided in the distribution box, so as to judge whether there is an abnormality in the power supply signal of each load in the power supply circuit.

Accordingly, the main distribution box 421 can monitor the power supply signal of each load in the main power supply circuit 420 through the sub-vehicle control unit in the main distribution box 421, and send the monitoring information of the power supply signal of each load in the main power supply circuit 420 to the vehicle control unit 460. Then, when the vehicle control unit 460 determines that there is a power supply fault in the main power supply circuit 420 based on the main power supply monitoring module 440, based on the power supply signal of each load in the main power supply circuit 420, it is possible to determine whether there is an abnormal power supply situation for each load in the main power supply circuit 420, and then position a fault point in the main power supply circuit 420.

Accordingly, the redundant distribution box 431 can monitor the power supply signal of each load in the redundant power supply circuit 430 through the sub-vehicle control unit in the redundant distribution box 431, and send the monitoring information of the power supply signal of each load in the redundant power supply circuit 430 to the vehicle control unit 460. Then, when the vehicle control unit 460 determines that there is a power supply fault in the redundant power supply circuit 430 based on the redundant power supply monitoring module 450, based on the power supply signal of each load in the redundant power supply circuit 430, it is possible to judge whether there is an abnormal power supply situation for each load in the redundant power supply circuit 430, and then position a fault point in the redundant power supply circuit 430.

The technical scheme provided by the present disclosure uses a distribution box in a main power supply circuit and a redundant power supply circuit to monitor a power supply signal of each load in a corresponding power supply circuit, so that after a power supply fault exists in any power supply circuit, a fault point in the power supply circuit can be accurately positioned according to an abnormal situation of the power supply signal of each load in the power supply circuit, so as to timely troubleshoot a fault point in any power supply circuit and improve the safety and reliability of redundant power supply for a vehicle.

Next, specific steps of various control operations of a vehicle control unit in a control system for vehicle redundant power supply executing vehicle redundant power supply will be described in detail.

FIG. 5 is a flowchart of a control method based on the vehicle redundant power supply shown in an embodiment of the present disclosure. The method is applicable to a control system for the vehicle redundant power supply provided by the present disclosure, and may be executed by a control device based on the vehicle redundant power supply provided by the present disclosure. The control device based on the vehicle redundant power supply may be implemented by any software and/or hardware. Illustratively, the control device based on vehicle redundant power supply may be applied to any vehicle, which may comprise, but is not limited to, autonomous vehicle, unmanned aerial vehicle, and the like. The present disclosure does not impose any limitation on the particular type of a vehicle.

Specifically, as shown in FIG. 5, the method may comprise steps as follows.

S510, acquire monitoring information about whether a power supply fault exists in the main power supply circuit and the redundant power supply circuit.

According to one or more embodiments of the present disclosure, to achieve a redundant power supply for a vehicle, the present disclosure will connect two power supply circuits respectively, one as the main power supply circuit and the other as the redundant power supply circuit, through an electric generator.

Furthermore, in either the main power supply circuit or the redundant power supply circuit, the power supply amount change condition in the power supply circuit can be monitored in real time via the power supply monitoring module to judge whether there is a power supply fault in the power supply circuit.

Accordingly, by monitoring a fault in any one of the main power supply circuit and the redundant power supply circuit, it is possible to acquire monitoring information on whether the power supply circuit has a power supply fault.

S520, according to the monitoring information about the main power supply circuit and the redundant power supply circuit, determine power supply support for the vehicle running by the main power supply circuit and the redundant power supply circuit.

Considering that a power supply circuit with a power supply fault cannot support the safe running of a vehicle, the present disclosure can respectively analyze monitoring information about the main power supply circuit and the redundant power supply circuit to judge whether either of the main power supply circuit and the redundant power supply circuit has a power supply fault.

Then, according to whether there is a power supply fault in the main power supply circuit and the redundant power supply circuit, the power supply support of the main power supply circuit and the redundant power supply circuit for vehicle running is switched in time. That is, a certain power supply circuit of the main power supply circuit and the redundant power supply circuit in which the power supply fault does not exist may be selected, and the vehicle running is controlled by the load normally powered in the power supply circuit in which the power supply fault does not exist.

As an alternative implementation scheme in the present disclosure, considering the redundant power supply circuit as a backup power supply scheme for the main power supply circuit, the power supply capability of the redundant power supply circuit may not be as comprehensive as the power supply capability of the main power supply circuit. Therefore, with regard to the control authority of the main power supply circuit and the redundant power supply circuit for vehicle running, it is possible to control the vehicle running by using a load normally powered in the redundant power supply circuit in response to a power supply fault existing in the main power supply circuit; on the other hand, in response to the absence of a power supply fault in the main power supply circuit (i.e., in response to a normal power supply in the main power supply circuit), vehicle running may be controlled by using a load that is normally powered in the main power supply circuit.

That is, when there is no power supply fault in the main power supply circuit, regardless of whether there is a power supply fault in the redundant power supply circuit, the vehicle running can be controlled by the load normally powered in the main power supply circuit. However, when there is a power supply fault in the main power supply circuit, the load that is normally powered in the redundant power supply circuit is controlled to take over the control authority for the vehicle running so as to control vehicle running.

In addition, in order to timely address a power supply fault present in any of the power supply circuits, the present disclosure may also, in response to a power supply fault in either the main power supply circuit or the redundant power supply circuit, provide a fault alarm to the power supply circuit.

Among other things, the present disclosure may use a variety of alarming modes, such as flashing lights, voice prompts, etc. to alarm a power supply fault in any power supply circuit, so as to facilitate timely maintenance by the staff.

According to one or more embodiments of the present disclosure, in order to ensure the accuracy of the power supply support of the main power supply circuit and redundant power supply circuit for controlling vehicle running, it is required that the power supply fault monitoring function in either of the main power supply circuit and the redundant power supply circuit can maintain a certain high accuracy. Accordingly, the present disclosure may further judge whether there is an abnormality in the power supply fault monitoring function in either the main power supply circuit or the redundant power supply circuit.

In the present disclosure, since in either of the main power supply circuit and the redundant power supply circuit, monitoring information of the power supply circuit can be generated jointly by a monitoring sensor, a switch element, and a control element, accordingly, the present disclosure can judge whether there is an abnormality in the power supply fault monitoring function in either of the main power supply circuit and the redundant power supply circuit by the following manner:

step one, acquiring a sensing parameter and a switch state parameter in the main power supply circuit and the redundant power supply circuit;

wherein the sensing parameters in the main power supply circuit and the redundant power supply circuit are sensing parameters monitored by a monitoring sensor for a specific power supply change condition in the power supply circuit, for example, current sensing parameter, voltage sensing parameter, temperature sensing parameter, etc. in the power supply circuit;

furthermore, a control element in any power supply circuit can determine whether there is a power supply fault in the power supply circuit according to a sensing parameter in the power supply circuit, so as to control the on-off state of a switch element, i.e. a switch state parameter in the power supply circuit can be obtained for indicating whether the switch element in the power supply circuit is in an on state or an off state;

step two, for each power supply circuit of the main power supply circuit and the redundant power supply circuit, determining whether there is an abnormality in the power supply fault monitoring function in the power supply circuit according to the sensing parameter and the switch state parameter in the power supply circuit;

wherein for either the main power supply circuit or the redundant power supply circuit, the presence of a power supply fault in the power supply circuit may be determined by the sensing parameter in the power supply circuit.

From the contents described in the system embodiment of the disclosure that the control element in either of the main power supply monitoring module and the redundant power supply monitoring module controls the on-off state of the switch element, it can be seen that the control element in any power supply circuit controls the switch element in the power supply circuit to switch off when it is determined that there is a power supply fault in the power supply circuit. The control element in any of the power supply circuits controls the switch elements in a power supply circuit to be on when it is determined that there is no power supply fault in that power supply circuit.

Therefore, after acquiring a sensing parameter in any power supply circuit and determining whether there is a power supply fault in the power supply circuit, the present disclosure can compare a power supply fault judgment result of the power supply circuit with a switch state parameter of the power supply circuit. Then, by determining whether the power supply fault judgment results represented by the two are consistent, it can be determined whether the power supply fault monitoring function in the power supply circuit is abnormal.

Illustratively, if a power supply fault is determined to exist in a power supply circuit based on a sensing parameter of the power supply circuit, the switch state parameter of the power supply circuit is that the switch element is in an on state. Alternatively, if, based on the sensing parameter of a power supply circuit, it is determined that the power supply circuit does not have a power supply fault, the switch state parameter of the power supply circuit is that the switch element is in an off state. Both of the above-mentioned cases indicate that the power supply fault monitoring function in the power supply circuit is abnormal and needs to be overhauled.

Further, the present disclosure may determine whether a power supply fault exists in the main power supply circuit and the redundant power supply circuit after acquiring the sensing parameter in the main power supply circuit and the redundant power supply circuit.

For any power supply circuit in which there is no power supply fault in the main power supply circuit and the redundant power supply circuit, it is taken into account that the sensing parameter in the power supply circuit may be close to the boundary value set for the power supply fault. Therefore, in order to ensure the safety and reliability of the redundant power supply of the vehicle, the present disclosure may also set one sensing parameter range for indicating an approaching fault condition for the sensing parameter in any power supply circuit.

For any power supply circuit in which there is no power supply fault in the main power supply circuit and the redundant power supply circuit, it can be determined whether a sensing parameter in the power supply circuit is within a preset sensing parameter range of an approaching fault state, thereby determining whether the power supply circuit is in the approaching fault state. Then, when the power supply circuit is in the above-mentioned approaching fault state, a fault warning prompt can be given to the power supply circuit so as to prompt the staff to troubleshoot the power supply circuit in advance.

It should be understood that the present disclosure may also further classify a plurality of approaching fault levels within the sensing parameter range indicative of the approaching fault state. Then, for different approaching fault levels of any power supply circuit in the above-mentioned approaching fault state, different degrees of fault early warning prompt can be performed on the power supply circuit. For example, when the fault warning prompt is performed by flashing lights, the higher the level of an approaching fault is, the faster the frequency of light flashing is.

According to one or more embodiments of the present disclosure, it can be seen from the description of system embodiments of the present disclosure for a distribution box in either of the main power supply circuit and the redundant power supply circuit to monitor a power supply signal for each load in the power supply circuit that the present disclosure can acquire the power supply signal for each load in the main power supply circuit and the redundant power supply circuit.

Then, in response to the presence of a power supply fault in either the main power supply circuit or the redundant power supply circuit, the power supply signal for each load in the power supply circuit may be analyzed for the presence of an abnormality. Furthermore, according to the abnormal information of the power supply signal of each load in the power supply circuit, the fault point in the power supply circuit can be positioned, so as to timely troubleshoot the fault point in any power supply circuit and improve the safety and reliability of the redundant power supply of the vehicle.

The technical scheme provided by the present disclosure is to acquire monitoring information about whether there is a power supply fault in a main power supply circuit and a redundant power supply circuit, and according to the monitoring information about the main power supply circuit and the redundant power supply circuit, verify the control authority of the main power supply circuit and the redundant power supply circuit for vehicle running, and realize fault monitoring of any circuit of vehicle redundant power supply, so as to isolate the main power supply circuit and the redundant power supply circuit so that the two power supply circuits do not affect each other, and improve the safety and reliability of the vehicle redundant power supply.

Figure 6:
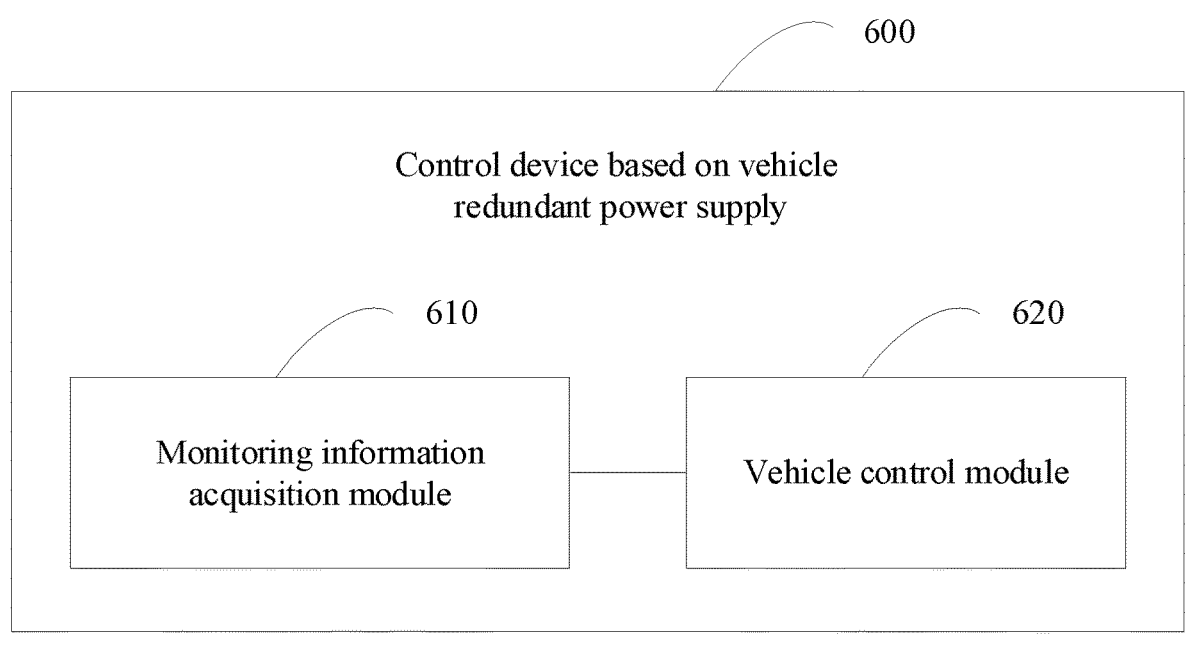
FIG. 6 is a block diagram of the principle of a control device based on vehicle redundant power supply shown in an embodiment of the present disclosure.

FIG. 6 is a block diagram of the principle of a control device based on a vehicle redundant power supply shown in an embodiment of the present disclosure. This device can be configured in a control system for the vehicle redundant power supply provided in the present disclosure. As shown in FIG. 6, the device 600 can comprise:

a monitoring information acquisition module 610 for acquiring monitoring information about whether a power supply fault exists in a main power supply circuit and a redundant power supply circuit; and a vehicle control module 620 for, according to the monitoring information about the main power supply circuit and the redundant power supply circuit, determining power supply support for the vehicle running by the main power supply circuit and the redundant power supply circuit.

According to one or more embodiments of the present disclosure, the vehicle control module 620 may be specifically configured to:

control vehicle running by a normally powered load in the redundant power supply circuit in response to a power supply fault existing in the main power supply circuit; and in response to the absence of a power supply fault in the main power supply circuit, control the vehicle running by a normally powered load in the main power supply circuit.

According to one or more embodiments of the present disclosure, the control device 600 based on vehicle redundant power supply may further comprise:

a fault alarm module for, in response to a power supply fault in either the main power supply circuit or the redundant power supply circuit, providing a fault alarm for the power supply circuit.

According to one or more embodiments of the present disclosure, the control device 600 based on vehicle redundant power supply may further comprise a functional abnormality judgment module.

The functional abnormality judgment module can be configured for:

acquiring a sensing parameter and a switch state parameter in the main power supply circuit and the redundant power supply circuit; and for each power supply circuit of the main power supply circuit and the redundant power supply circuit, determining whether there is an abnormality in the power supply fault monitoring function in the power supply circuit according to the sensing parameter and the switch state parameter in the power supply circuit.

According to one or more embodiments of the present disclosure, the control device 600 based on vehicle redundant power supply may further comprise a fault warning module.

The fault warning module can be configured for:

for any power supply circuit which does not have a power supply fault in the main power supply circuit and the redundant power supply circuit, determining whether the power supply circuit is in an approaching fault state according to a sensing parameter in the power supply circuit; and in response to the power supply circuit being in the approaching fault state, performing a fault warning prompt for the power supply circuit.

According to one or more embodiments of the present disclosure, the control device 600 based on the vehicle redundant power supply may further comprise a fault positioning module.

The fault positioning module can be configured for:

acquiring a power supply signal of each load in the main power supply circuit and the redundant power supply circuit; and in response to a power supply fault existing in either of the main power supply circuit and the redundant power supply circuit, determining a fault point in the power supply circuit based on the power supply signal for each load in the power supply circuit.

The embodiments of the present disclosure are to acquire monitoring information about whether there is a power supply fault in a main power supply circuit and a redundant power supply circuit, and according to the monitoring information about the main power supply circuit and the redundant power supply circuit, verify the control authority of the main power supply circuit and the redundant power supply circuit for vehicle running, and realize fault monitoring of any circuit of vehicle redundant power supply, so as to isolate the main power supply circuit and the redundant power supply circuit so that the two power supply circuits do not affect each other, and improve the safety and reliability of the vehicle redundant power supply.

It should be understood that the device embodiments and method embodiments may correspond to each other and that similar descriptions may refer to method embodiments. In order to avoid repetition, it will not be repeated herein. Specifically, the device 600 shown in FIG. 6 may execute any method embodiment provided by the present disclosure, and the foregoing and other operations and/or functions of the various modules in the device 600, respectively, in order to implement the corresponding flows in various methods of the embodiments of the present disclosure, will not be described in detail herein for the sake of brevity.

The device 600 of an embodiment of the present disclosure is described above in connection with the drawings from a functional module perspective. It should be understood that this functional module can be implemented through hardware, software instructions, or a combination of hardware and software modules. Specifically, various steps of method embodiments in the embodiments of the present disclosure may be performed by instructions in the form of integrated logic circuits in hardware and/or software instructions in a processor, and steps of methods disclosed in connection with the embodiments of the present disclosure may be embodied directly reflected in the completion of hardware decoding processor execution, or the combination execution of hardware and software modules in a decoding processor. Alternatively, the software module may reside in random access memory, flash memory, read-only memory, programmable read-only memory, electrically erasable programmable memory, registers, or like storage medium as is well known in the art. The storage medium is located in the memory. The processor reads the information in the memory and, in conjunction with its hardware, completes the steps in the above-mentioned method embodiments.

Figure 7:
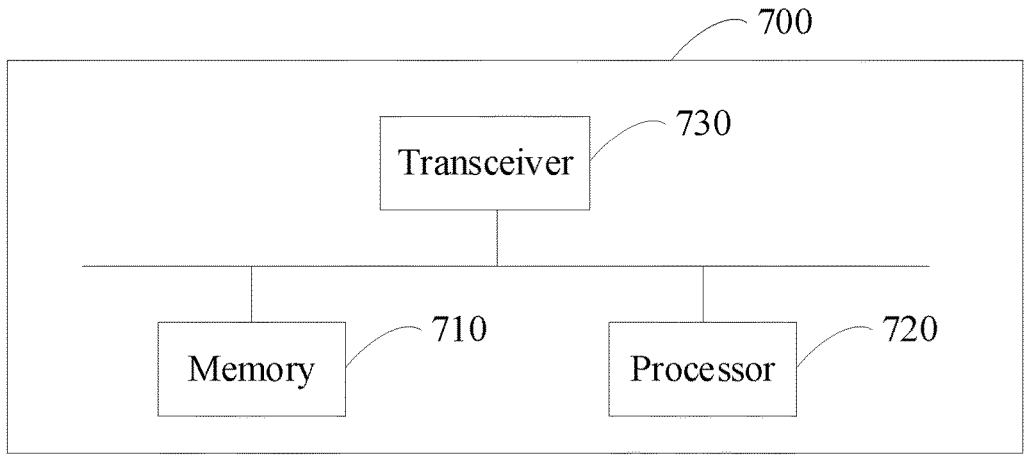
FIG. 7 is a schematic block diagram of computing device provided by an embodiment of the present disclosure.

FIG. 7 is a schematic block diagram of computing device provided by an embodiment of the present disclosure.

As shown in FIG. 7, the computing device 700 can comprise:

a memory 710 and a processor 720, wherein the memory 710 is configured for storing a computer program and transmitting the program code to the processor 720. In other words, the processor 720 may call a computer program from the memory 710 and run the computer program to implement the methods in the embodiments of the present disclosure.

For example, the processor 720 may be used to execute the method embodiments described above according to instructions in the computer program.

In some embodiments of the present disclosure, the processor 720 may include but is not limited to:

a general-purpose processor, a digital signal processor (DSP), an application-specific integrated circuit (ASIC), a field programmable gate array (FPGA) or other programmable logic devices, discrete gate or transistor logic devices, discrete hardware assemblies, etc.

In some embodiments of the present disclosure, the memory 710 includes but is not limited to:

a volatile memory and/or a non-volatile memory. The non-volatile memory may be a Read-Only Memory (ROM), a programmable read-only memory (Programmable ROM, PROM), an erasable programmable read-only memory (Erasable PROM, EPROM), an electrically erasable programmable read-only memory (Electrically EPROM, EEPROM) or a flash memory. The volatile memory can be random access memory (RAM), which acts as the external cache memory. By way of illustration and not limitation, many forms of RAM are available such as static random access memory (Static RAM, SRAM), dynamic random access memory (Dynamic RAM, DRAM), synchronous dynamic random access memory (Synchronous DRAM, SDRAM), double data rate synchronous dynamic random access memory (Double Data Rate SDRAM, DDR SDRAM), enhanced synchronous dynamic random access memory (Enhanced SDRAM, ESDRAM), synch link dynamic random access memory (synch link DRAM, SLDRAM), and direct rambus random access memory (Direct Rambus RAM, DR RAM).

In some embodiments of the present disclosure, the computer program may be divided into one or more modules, which are stored in the memory 710 and executed by the processor 720 to complete the method provided in the present disclosure. One or more modules can be a series of computer program instruction segments capable of completing specific functions, and the instruction segments are used to describe the execution process of the computer program in the computing device.

As shown in FIG. 7, the computing device can further comprise:

a transceiver 730, which can be connected to the processor 720 or the memory 710.

The processor 720 can control the transceiver 730 to communicate with other device, and in particular, can send information or data to or receive information or data sent by other device. The transceiver 730 may comprise a transmitter and a receiver. The transceiver 730 may further comprise an antenna, and the number of antennas may be one or more.

It should be understood that various assemblies of the computing device are connected by a bus system that comprises a power bus, a control bus, and a state signal bus in addition to a data bus.

An embodiment of the present disclosure further provides a computer storage medium on which a computer program is stored. The computer program enables the computer to execute the method of the method embodiment when executed by a computer. Alternatively, an embodiment of the present disclosure further provides a computer program product containing instructions that, when executed by a computer, cause the computer to execute the method of the method embodiment described above.

When implemented by using software, it can be fully or partially implemented in the form of a computer program product. The computer program product comprises one or more computer instructions. When the computer program instructions on a computer are loaded and executed, all or part of the processes or functions according to the embodiments of the present disclosure are generated. The computer may be a general-purpose computer, a special-purpose computer, a computer network, or other programmable devices. The computer instruction may be stored in a computer-readable storage medium or transmitted from one computer-readable storage medium to another computer-readable storage medium. For example, the computer instructions may be transmitted from one website, computer, server, or data center to another website, computer, server, or data center by wire (e.g. coaxial cable, fiber optic, digital subscriber line (DSL)) or wirelessly (e.g. infrared, wireless, microwave, etc.) manner. The computer-readable storage medium can be any available medium that can be accessed by a computer, or data storage equipment including one or more available media integrated server, data center, or the like. The available medium may be a magnetic medium (e.g. floppy disk, hard disk, magnetic tape), an optical medium (e.g. digital video disc, DVD), or a semiconductor medium (e.g. solid state disk, SSD), etc.

Those of ordinary skills in the art would recognize that the modules and algorithm steps of the examples described in combination with the embodiments disclosed herein can be implemented by electronic hardware or a combination of computer software and electronic hardware. Whether such functionality is executed as hardware or software depends upon the particular application and design constraints of the technical scheme. Technicians may use different methods for each specific application to realize the described functions, but such realization should not be considered as going beyond the scope of the present disclosure.

In several embodiments provided in this disclosure, it should be understood that the disclosed systems, devices, and methods can be implemented in other ways. For example, the apparatus embodiments described above are merely illustrative. For example, the division of the modules is only a logical function division, and there may be other division modes in actual implementation. For example, multiple modules or assemblies may be combined or integrated into another system, or some features can be ignored or not executed. Another point is that the couplings or direct couplings or communication connections shown or discussed with respect to each other may be indirect couplings or communication connections through some interfaces, devices, or modules, and may be electrical, mechanical, or otherwise.

The modules described as separate components may or may not be physically separated, and the components displayed as modules may or may not be physical modules, that is, they may be located in one place, or they may be distributed on multiple network units. Some or all of the modules can be selected according to actual needs to achieve the purpose of the scheme of the embodiment. For example, in various embodiments of the present disclosure, each functional module can be integrated into a single processing module, each module can physically exist separately, or two or more modules can be integrated into one module.

The above is only a specific implementation mode of the present disclosure, and the scope of protection of this disclosure is not limited to this. Any technical personnel familiar with the technical field can easily think of changes or replacements within the scope of the technology disclosed in this disclosure, which should be covered in the scope of protection of this disclosure. Accordingly, the scope of protection of this disclosure shall be subjected to the scope of protection of the claims.

What is claimed is:

1. A control system for vehicle redundant power supply comprising:

a main power supply circuit comprising a main power supply monitoring module for monitoring the main power supply circuit and generating monitoring information indicating whether a power supply fault exists in the main power supply circuit;

a redundant power supply circuit comprising a redundant power supply monitoring module for monitoring the redundant power supply circuit and generating monitoring information indicating whether a power supply fault exists in the redundant power supply circuit; and a vehicle control unit connected to the main power supply circuit and the redundant power supply circuit respectively, and configured for determining one of the main power supply circuit and the redundant power supply circuit as a target power supply circuit for controlling vehicle running according to monitoring information received from the main power supply circuit and the redundant power supply circuit;

wherein the main power supply monitoring module is configured to provide a fault alarm for the main power supply circuit in response to the power supply fault existing in the main power supply circuit, and the redundant power supply monitoring module is configured to provide a fault alarm for the redundant power supply circuit in response to the power supply fault existing in the redundant power supply circuit.

2. The system according to claim 1, wherein the main power supply monitoring module comprises at least one of a monitoring sensor, a switch element, and a control element;

the monitoring sensor is configured for acquiring a sensing parameter in the main power supply circuit, and sending the sensing parameter to the control element;

the control element is configured for determining whether there is a power supply fault in the main power supply circuit according to the sensing parameter, controlling an on-off state of the switch element according to the determination and generating corresponding monitoring information indicating whether there is a power supply fault in the main power supply circuit.

3. The system according to claim 2, wherein:

the monitoring sensor comprises at least one of a current sensor, a voltage sensor, or a temperature sensor; and the switch element is a Metal-Oxide-Semiconductor Field-Effect Transistor switch;

the control element is further configured for determining whether there is the power supply fault in the main power supply circuit according to the sensing parameter and switching state of the switch element in the main power supply circuit.

4. The system according to claim 2, wherein the control element is further configured for determining whether a power supply fault monitoring function in the power supply circuit is abnormal by determining whether the power supply fault consists with a switch state parameter of the main power supply circuit.

5. The system according to claim 1, wherein the redundant power supply monitoring module comprises at least one of a monitoring sensor, a switch element, and a control element;

the monitoring sensor is configured for acquirring a sensing parameter in the redundant power supply circuit, and sending the sensing parameter to the control element;

the control element is configured for determining whether there is a power supply fault in the redundant power supply circuit according to the sensing parameter, controlling an on-off state of the switch element according to the determination and generating corresponding monitoring information indicating whether there is a power supply fault in the redundant power supply circuit.

6. The system according to claim 1, wherein:

the main power supply circuit and the redundant power supply circuit are electrically connected to an electric generator respectively;

the main power supply monitoring module is connected in series between the electric generator and a positive electrode circuit of a storage battery in the main power supply circuit; and the redundant power supply monitoring module is connected in series between the electric generator and a positive electrode circuit of a storage battery in the redundant power supply circuit.

7. The system according to claim 1, wherein the vehicle control unit comprises a first vehicle control unit and a second vehicle control unit connected communicatively;

wherein the first vehicle control unit is connected to the main power supply monitoring module and is configured for sending monitoring information about the main power supply circuit to the second vehicle control unit, and determining the redundant power supply circuit as the target power supply circuit for controlling vehicle running according to the monitoring information about the redundant power supply circuit sent by the second vehicle control unit;

the second vehicle control unit is connected to the redundant power supply monitoring module, and is configured for sending monitoring information about the redundant power supply circuit to the first vehicle control unit, and determining the main power supply circuit as the target power supply circuit for controlling vehicle running according to the monitoring information about the main power supply circuit sent by the first vehicle control unit.

8. The system according to claim 1, wherein:

the main power supply circuit comprises a first type of load relating to performance item and a second type of load relating to safety item; and the redundant power supply circuit comprises a redundant second type of load relating to safety item;

wherein the first type of load comprises at least one of an engine, a sensor, a starter, a lighting system, an air conditioning system, the second type of load comprises a load in at least one of a braking system, a steering system, an automatic driving system.

9. The system according to claim 8, wherein the vehicle control unit is further configured to:

in response to the power supply fault in the main power supply circuit, determine a fault point in the main power supply circuit according to power supply signals of the loads in the main power supply circuit;

in response to the power supply fault in the redundant power supply circuit, determine a fault point in the redundant power supply circuit according to power supply signals of the loads in the redundant power supply circuit.

10. The system according to claim 1, wherein the main power supply circuit further comprises:

a main distribution box connected to the vehicle control unit and each load in the main power supply circuit, the main distribution box being configured for monitoring a power supply signal of each load in the main power supply circuit and sending a power supply signal to the vehicle control unit;

wherein the redundant power supply circuit further comprises:

a redundant distribution box connected to the vehicle control unit and each load in the redundant power supply circuit, the redundant distribution box being configured for monitoring a power supply signal of each load in the redundant power supply circuit and sending the power supply signal of each load to the vehicle control unit.

11. The system according to claim 1, wherein:

the system further comprises a bus bar connected to a electric generator, the main power supply circuit and the redundant power supply circuit respectively;

the bus bar is confirgured to divide current output of the electric generator into two for a transmission to the main power supply circuit and the redundant power supply circuit respectively, to isolate the main power supply circuitand the redundant power supply circuit;

at least one of the main power supply circuit and the redundant power supply circuit comprises an anti-reverse diode, the anti-reverse diode being configured for unidirectional rectification of current the corresponding power supply circuit.

12. A control method for vehicle redundant power supply comprising:

acquiring monitoring information about whether a power supply fault exists in a main power supply circuit from a main power supply monitoring module in the main power supply circuit;

acquiring monitoring information about whether a power supply fault exists in a redundant power supply circuit from a redundant power supply monitoring module in the redundant power supply circuit; and according to the monitoring information about the main power supply circuit and the monitoring information about the redundant power supply circuit, determining one of the main power supply circuit and the redundant power supply circuit as a target power supply circuit for controlling vehicle running;

wherein the method further comprises:

in response to the power supply fault existing in the main power supply circuit, providing a fault alarm for the main power supply circuit; and in response to the power supply fault existing in the redundant power supply circuit, providing a fault alarm for the redundant power supply circuit.

13. The method according to claim 12, wherein determining one of the main power supply circuit and the redundant power supply circuit as the target power supply circuit for controlling vehicle running comprises:

controlling vehicle running by a normally powered load in the redundant power supply circuit in response to the power supply fault existing in the main power supply circuit; and controlling vehicle running by a normally powered load in the main power supply circuit in response to an absence of a power supply fault in the main power supply circuit.

14. The method according to claim 11, further comprising:

acquiring a sensing parameter and a switch state parameter in the main power supply circuit and the redundant power supply circuit; and for each power supply circuit of the main power supply circuit and the redundant power supply circuit, determining whether there is an abnormality in a power supply fault monitoring function in the corresponding power supply circuit according to the sensing parameter and the switch state parameter in the corresponding power supply circuit.

15. The method according to claim 14, further comprising:

for any power supply circuit which does not have a power supply fault in the main power supply circuit and the redundant power supply circuit, determining whether the power supply circuit is in an approaching fault state according to the sensing parameter in the power supply circuit; and in response to the power supply circuit being in the approaching fault state, performing a fault warning prompt for the power supply circuit.

16. The method according to claim 12, further comprising:

acquiring a power supply signal of each load in the main power supply circuit and the redundant power supply circuit;

in response to the power supply fault existing in the main power supply circuit, determining a fault point in the main power supply circuit based on the power supply signals of the loads in the main power supply circuit; and in response to the power supply fault existing in the redundant power supply circuit, determining a fault point in the redundant power supply circuit based on the power supply signals of the loads in the redundant power supply circuit.

17. A non-transitory computer-readable storage medium configured to store a computer program that enables a computer to execute a method according to claim 12.

18. The method according to claim 12, further comprising, for each power supply circuit of the main power supply circuit and the redundant power supply circuit:

determining a plurality of approaching fault levels according to sensing parameter range indicative of the approaching fault state; and performing different degrees of fault early warning for different approaching fault levels of the power supply circuit.

19. A computing device comprising:

a processor and a memory, wherein the memory is configured to store a computer program, and the processor is configured to call and run a computer program stored in the memory to execute a method comprising:

acquiring monitoring information about whether a power supply fault exists in a main power supply circuit from a main power supply monitoring module in the main power supply circuit;

acquiring monitoring information about whether a power supply fault exists in a redundant power supply circuit from a redundant power supply monitoring module in the redundant power supply circuit; and according to the monitoring information about the main power supply circuit and the monitoring information about the redundant power supply circuit, determining a target power supply for controlling vehicle running from the main power supply circuit and the redundant power supply circuit;

wherein the method further comprises:

in response to the power supply fault existing in the main power supply circuit, providing a fault alarm for the main power supply circuit; and in response to the power supply fault existing in the redundant power supply circuit, providing a fault alarm for the redundant power supply circuit.

20. The computer device according to claim 19, wherein the method further comprises:

for each power supply circuit of the main power supply circuit and the redundant power supply circuit, in response to the power supply fault existing in the power supply circuit, providing a fault alarm for the power supply circuit;

determining whether the power supply circuit is in an approaching fault state according to sensing parameter in the power supply circuit; and in response to the power supply circuit being in the approaching fault state, performing a fault warning for the power supply circuit.

* * * * *